(12) United States Patent
Wortendyke et al.

(10) Patent No.: US 7,539,691 B2
(45) Date of Patent: May 26, 2009

(54) SYSTEMS AND METHODS FOR UPDATING A QUERY ENGINE OPCODE TREE

(75) Inventors: David Wortendyke, Seattle, WA (US);
Umesh Madan, Bellevue, WA (US);
Geary L. Eppley, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 723 days.

(21) Appl. No.: 10/783,598

(22) Filed: Feb. 20, 2004

(65) Prior Publication Data

US 2005/0187907 A1   Aug. 25, 2005

(51) Int. Cl.
*G06F 17/30* (2006.01)
(52) U.S. Cl. .................. 707/101; 707/100; 707/102
(58) Field of Classification Search .............. 707/2–3, 707/101
See application file for complete search history.

(56) References Cited

U.S. PATENT DOCUMENTS

| | | | |
|---|---|---|---|
| 5,574,900 | A | 11/1996 | Huang et al. |
| 6,009,265 | A | 12/1999 | Huang et al. |
| 6,253,195 | B1 | 6/2001 | Hudis et al. |
| 6,529,897 | B1 | 3/2003 | Corl, Jr. et al. |
| 6,539,394 | B1 | 3/2003 | Calvignac et al. |
| 6,654,734 | B1 | 11/2003 | Mani et al. |
| 6,757,686 | B1 * | 6/2004 | Syeda-Mahmood et al. . 707/100 |
| 7,136,899 | B1 | 11/2006 | Campailla |

2004/0027313 A1   2/2004 Pate et al.

OTHER PUBLICATIONS

Aguilera et al, Matching Events in an Content-based Subscription System, 1999, ACM, Proceedings of the eighteenth annual ACM symposium on Principles of distributed computing, pp. 53-61 http://doi.acm.org/10.1145/301308.301326.*
Graefe et al, Dynamic query evaluation plans, 1989, ACM, Proceedings of the 1989 ACM SIGMOD international conference on management of data, pp. 358-366, http://doi.acm.org/10.1145/67544.66960.*
Java API, Interface Node, 2003, Sun Microsystems, Java 2 Platform Std. Ed. v1.4.2, http://java.sun.com/j2se/1.4.2/docs/api/org/w3c/dom/Node.html.*

(Continued)

*Primary Examiner*—Yicun Wu
(74) *Attorney, Agent, or Firm*—Lee & Hayes, PLLC

(57) ABSTRACT

Implementations described herein relate to using a filter engine opcode tree for evaluating multiple queries. The opcode tree includes opcode nodes and branch nodes. Each opcode node includes one or more computer instructions resulting from compiling a query. Executing the opcode tree a single time evaluates each of multiple queries represented in the opcode tree. When a new opcode node is added to the tree, the context of the opcode tree and the structure of the new opcode are taken into account when modifying a branch node or an opcode node. In certain situation, a branch node is optimized to include an indexed lookup function such as a hash function, to optimize processing of opcode nodes that depend from the branch node. Adding and removing nodes to/from the opcode tree can be handled by a filter engine component or by an opcode object being added to/removed from the tree.

30 Claims, 6 Drawing Sheets

OTHER PUBLICATIONS

W3C, XML Path Language (XPath) Version 1.0, Nov. 16, 1999, W3C Recommendations, http://www.w3.org/TR/1999/REC-xpath-19991116.*

Cole et al, Optimization of dynamic query evaluation plans, 1994, ACM, Proceedings of the 1994 ACM SIGMOD international conference on Management of data, pp. 150-160, http://doi.acm.org/10.1145/191839.191872.*

Yan et al, Index Structures for Selective Dissemination of Information Under the Boolean Model, Jun. 1994, ACM Transactions on Database Systems, http://citeseer.ist.psu.edu/97449.html.*

IEEE Standards, http://www.ieee.org/web/standards/home/index.html.*

Andersen, Henrik Reif, "An Introduction to Binary Decision Diagrams," Lecture nodes for 49285 Advanced Algorithms E97, Department of Information Technology, Technical University of Denmark, Oct. 1997, pp. 1-37.

Bryant, Randal E., "Symbolic Boolean Manipulation with Ordered Binary Decision Diagrams," CMU-CS-92-160, ACM Computing Surveys, School of Computer Science, Carnegie Mellon University, Pittsburg, PA, Jul. 1992, pp. 1-33.

Socher, Rolf, "Optimizing the Clausal Normal Form Transformation," Journal of Automated Reasoning, vol. 7, 1991, pp. 325-336.

Atinel et al., "Efficient Filtering of XML Documents for Selective Dissemination of Information," Proceedings of the 26th VLDB Conference, 2002, pp. 53-64.

Lakshmanan, et al., "On Efficient Matching of Streaming XML Documents and Queries", pp. 1-18.

* cited by examiner

Opcode Tree
300

Parallel Evaluation of Multiple Queries

Merging a Query Into an Opcode Tree

SYSTEMS AND METHODS FOR UPDATING A QUERY ENGINE OPCODE TREE

RELATED APPLICATION

This application is related to U.S. patent application Ser. No. 10/783,343, entitled "Systems and Methods for Parallel Evaluation of Multiple Queries" by the Applicants named herein, filed Feb. 20, 2004.

TECHNICAL FIELD

The systems and methods described herein generally relate to query processing using a filter engine opcode tree and, more particularly, to systems and methods for updating a filter engine opcode tree.

BACKGROUND

Computing systems—i.e. devices capable of processing electronic data such as computers, telephones, Personal Digital Assistants (PDA), etc.—communicate with other computing systems by exchanging data messages according to a communications protocol that is recognizable by the systems. Such a system utilizes filter engines containing queries that are used to analyze messages that are sent and/or received by the system and to determine if and how the messages will be processed further.

A filter engine may also be called an "inverse query engine." Unlike a database, wherein an input query is tried against a collection of data records, an inverse query engine tries an input against a collection of queries. Each query includes one or more conditions, or rules, that must be satisfied by an input for the query to evaluate to true against the input.

A collection of queries usually takes the form of one or more filter tables that may contain hundreds or thousands of queries, and each query may contain several conditions. Significant system resources (e.g., setting up query contexts, allocating buffers, maintaining stacks, etc.) are required to process an input against each query in the filter table(s) and, therefore, processing an input against hundreds or thousands of queries can be quite expensive.

Queries included in a particular system may be somewhat similar since the queries are used within the system to handle data in a like manner. As a result, several queries may contain common expressions that currently must be evaluated individually. It would be advantageous to exploit redundant expressions contained in multiple queries to significantly reduce overhead expenses associated with query processing.

SUMMARY

At least one implementation described herein relates to updating a filter engine opcode tree that is used to evaluate an input against multiple queries by evaluating common query expressions of the queries at the same time, i.e. in parallel. An opcode block is derived from the compilation of a query into a series a sequential set of instructions, or opcodes. One query corresponds to one opcode block and each opcode contained there is an opcode object. A logical opcode tree structure having opcode object nodes and branch nodes is maintained whereby each tree segment included in a shared path represents an opcode block prefix that is common to two or more queries. Common opcode block prefixes are represented in the opcode tree by a single set of opcode nodes so that a single execution of the opcode tree against an input results in evaluation of each of the multiple queries against the input. As a result, opcode objects are executed only once even though they may correspond to multiple queries.

Branch nodes connect one tree segment to multiple dependent opcode nodes. In at least one implementation, in an instance where several opcode nodes that depend from a branch node perform a similar function, such as a literal comparison, the branch node includes logic to perform an optimized lookup routine to process the dependent opcode nodes. The optimized lookup routine may include a hash routine or the like.

Implementations to dynamically add or remove an opcode node from an opcode tree at runtime are also described. When an opcode node is added to an existing opcode tree, a branch node may be optimized to include optimization techniques, such as hashing, tries, interval trees, etc. Merging and removing opcode nodes may be handled by a component of the filter engine or by the opcode node itself, which can be configured to recognize certain characteristics of the opcode tree in relation to its own structure.

BRIEF DESCRIPTION OF THE DRAWINGS

A more complete understanding of exemplary systems and methods described herein may be had by reference to the following detailed description when taken in conjunction with the accompanying drawings wherein.

DETAILED DESCRIPTION

Figure 1:
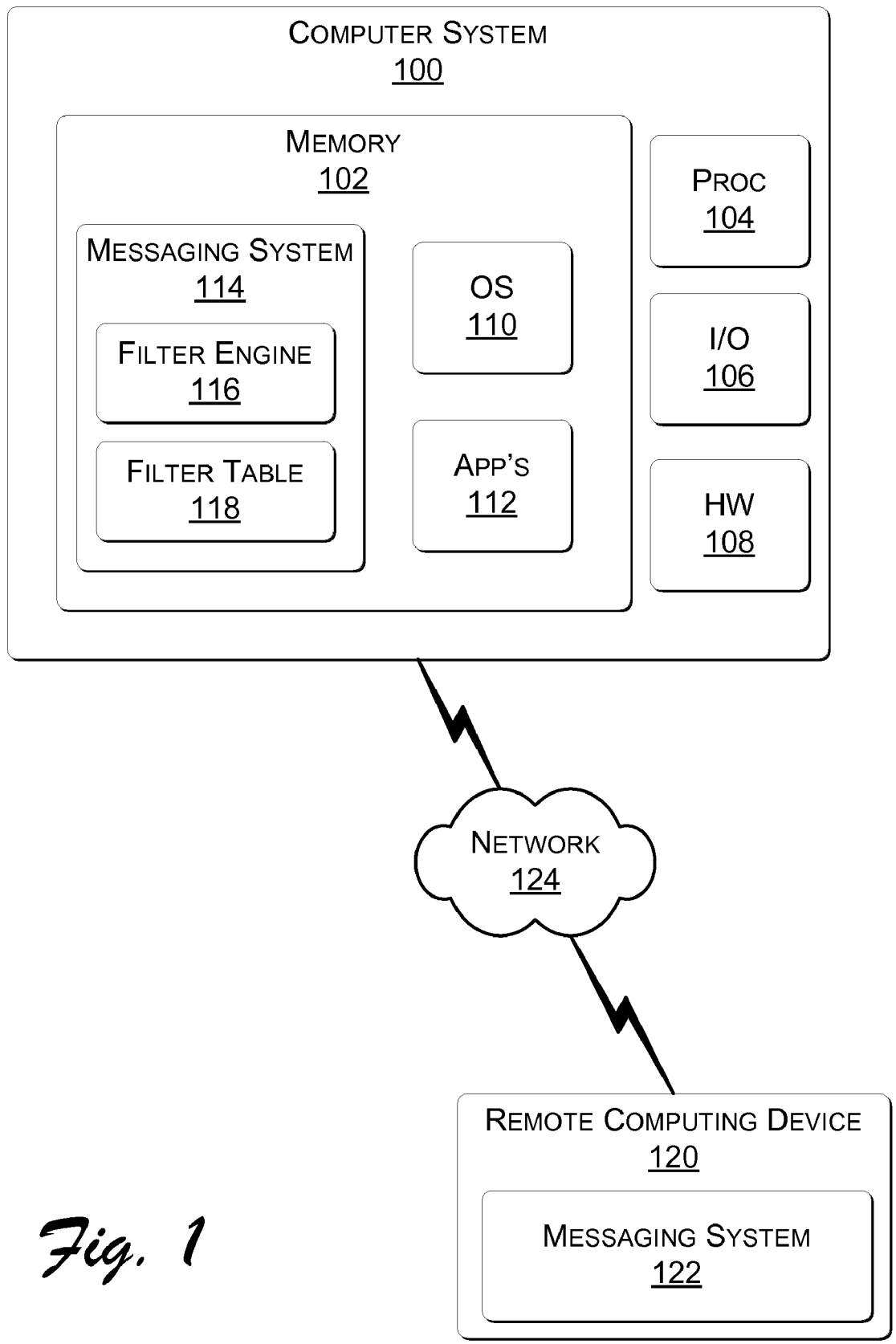
FIG. 1 is a block diagram of an exemplary messaging system having a filter engine.

The present disclosure relates to systems and methods that streamline query processing by executing similar expressions included in different queries simultaneously to reduce a number of operations that must be performed to evaluate each individual query. The examples shown and described herein specifically relate to messaging systems with inverse query engines that process multiple XPath queries against an input message.

Although specific examples are used herein, the specific examples are not intended to limit the scope of the claims appended hereto, but are provided to show one way in which the claimed subject matter may be implemented. The techniques described herein may be applied to other types of query processing systems, such as subscription services, security applications, and the like, and they may be used with other query languages.

An inverse query engine tests a collection of queries against an input and selects queries that are satisfied, or matched, by the input. Queries may also be referred to as filters, and an inverse query engine may also be referred to as a filter engine.

A basic inverse query engine separately tests an input against each of multiple queries. Such an engine becomes increasingly inefficient as the number of queries it processes grows. Filter tables (composed of queries) used in message routing systems, subscription systems and the like can contain hundreds and thousands of queries. Using a basic inverse query engine with such a system can hinder query processing within the system.

In many inverse query processing systems—e.g. messaging systems—queries included in a system filter table may be similar or have logical elements in common. The techniques described herein exploit these similarities to introduce parallelism into query evaluation, combining processing of redundant query elements so that such an element need only be performed a single time.

In one or more examples shown and described herein, an inverse query engine evaluates an entire filter table by executing an opcode tree that corresponds to the filter table. Each query in the filter table is compiled into a linear list—i.e. a sequence—of opcodes called an opcode block. A query is evaluated by executing the opcode block that results from compiling the query. An opcode block of one query may have a prefix in common with one or more opcode blocks of other queries.

The opcode tree includes a root node, opcode nodes and branch nodes. Each query is represented in the opcode tree by a path beginning from the root node and extended through the tree. When multiple queries include a similar opcode block prefix, the paths corresponding to the queries share a common segment beginning with the root node until a dissimilar opcode object in the respective opcode blocks is reached. At such a point in the opcode tree, a branch node connects the common path segment with a diverging path segment for each dissimilar opcode object that follows the similar opcode block prefix. Diverging path segments can be common to multiple queries and can diverge further.

When an input is received for evaluation against the multiple queries, the inverse query engine executes the entire opcode tree at once. As a result, opcode objects that correspond to multiple queries are executed only one time and the result of the execution is used in the evaluation of the input against each query that corresponds to the common opcode objects.

Branch nodes are used to connect opcode tree segments. A branch node is located in an opcode tree between a tree segment that is common to multiple queries and tree branches that diverge from the common tree segment, each representing a unique portion of a query opcode block. A branch node includes logic for evaluating one or more branches that diverge from the branch node. The logic may simply reference dependent opcode nodes, or the logic may include one or more optimization techniques for processing subordinate tree segments, such as using a hash table in an instance where a number of subordinate opcode objects are similar literal comparisons.

In at least one implementation, a branch node also includes logic that implements an optimization technique when it is warranted and removes the optimization technique when it no longer needed. For example, a branch node may be configured to implement a hash table when it detects that a certain number of subordinate opcode nodes execute literal comparisons. The branch node may also be configured to revert from the hash table to a linear comparison in the event that the number of literal comparison opcode objects is reduced to a point where a hash table is no longer effective.

To execute an opcode tree, an inverse query engine begins at a root node of the tree and executes subordinate nodes until a branch node is reached. Each branch diverging from the branch node is executed independently. For each branch taken, a shallow, optimized copy of the execution context is produced. The execution context contains all of the intermediate operation state gathered by evaluating opcode objects. For example, if the query processor is a stack machine, then the execution context would include a stack that contains results of the opcode node evaluation until the branch node was reached. The assumption is that performing a fast shallow copy of the context (usually just a memcopy) is more efficient than independently reproducing the intermediate data multiple times—and hence the rationale behind merging opcodes from multiple queries into a single opcode tree. If each query is evaluated separately, the context would have to be reproduced. This is a resource expense that is avoided by merging the opcodes into an opcode tree. When a branch node is encountered while processing a particular tree branch, the same execution process is applied recursively.

Intermediate Results

As described above, intermediate results obtained during execution of the opcode tree are cached and re-used to economize processing overhead. Any particular implementation of a technique for caching and retrieving intermediate results may be utilized without affecting the scope of the appended claims.

Regardless of the particular implementation, the execution context contains all of the intermediate operation state gathered by evaluating opcode nodes. During the execution of the opcode tree, when a branch node or a leaf node is reached, the execution context has the result of the execution to that point.

When a branch node is reached and individual branches therefrom are executed, the manner in which the execution context is handled depends on a particular way in which a query processor operates. One implementation utilizes a stack machine query processor. In a stack machine, an execution context includes a stack in which intermediate operands and opcode node evaluation results are stored. Opcodes push and pop data and nodesets to and from the stack.

For each branch taken in the present case, an optimized copy of the evaluation context is made. This is a simple procedure (typically just a memcopy) that is more efficient than reproducing the evaluation context multiple times (once for each branch taken). In a typical situation, if each query was evaluated independently, redundant opcodes would have to be re-executed and the execution context reproduced multiple times.

In another implementation, a variable machine could be utilized instead of a stack machine. When using a query language that has no side effect (such as XPath), the query processor could utilize variables, where each unique intermediate result corresponds to a unique variable.

In this implementation, the evaluation context includes a variable table. Each opcode node in the opcode tree that produces a unique result (e.g., an opcode that adds two numbers produces a new result) is associated with a predefined variable. An opcode node evaluates by setting its associated variable in the evaluation context.

When a branch node is encountered, the execution context does not need to be reproduced since each opcode node is associated with a unique variable, i.e. a variable that, once set, doesn't change during the execution of the opcode tree. While this implementation is more efficient in some terms, one problem associated with it is that the variable table can be quite large, thereby making some aspects of the present invention more difficult to implement.

Therefore, a particular implementation for handling intermediate results must take into account certain characteristics of an execution environment. However, any method known in the art for caching and retrieving intermediate results may be utilized with the presently described systems and methods.

Opcode Tree Copy

In some systems, it is important that an opcode tree be available for maintenance (adding and/or removing nodes) at the same time that it can be used to process queries. In one implementation a copy of the opcode tree may also be maintained so that opcodes can be merged into or removed from the opcode tree while the opcode tree copy can be contemporaneously used for query processing. In an alternative implementation, a read/write precedence may be established wherein read operations related to the opcode tree have precedence over write operations. As a result, the opcode tree can be used for processing during an operation to merge or remove opcodes from the tree since the opcode tree since no opcodes can be added to the opcode tree during a merging process.

These and other features are described in greater detail, below, with respect to the figures which depict specific exemplary implementations.

Exemplary Computer System

FIG. 1 is a simplified block diagram of an exemplary computer system 100 in accordance with the presently described systems and methods. The exemplary computer system 100 as shown encompasses at least a portion of a messaging system 114 in memory 102. The computer system 100 also includes a processor 104 for executing computer instructions and an input/output (I/O) module 106 for receiving and transmitting data to/from the computer system 100. The computer system 100 also includes a number of hardware components 108 that are not specified herein, but are necessary to support operation of the computer system 100.

The memory 102 stores an operating system 110 that controls operation of the computer system 100 and one or more software applications 112 that support particular functions of the computer system 100. The messaging system 114 includes a filter engine 116 and a filter table 118 which are used to process messages. Example in which the present streamlined query processing can perform including, but not limited to, a .NET environment and a Common Language Runtime (CLR) environment.

The computer system 100 is configured to communicate over a network 124 with a remote computing device 120 that includes a messaging system component 122. The messaging system component 122 is configured to send messages to the messaging system 114 of the computer system 100 over the network 124, which may be a local area network (LAN), a wide area network (WAN), the Internet or the like.

Exemplary Inverse Query Engine

Figure 2:
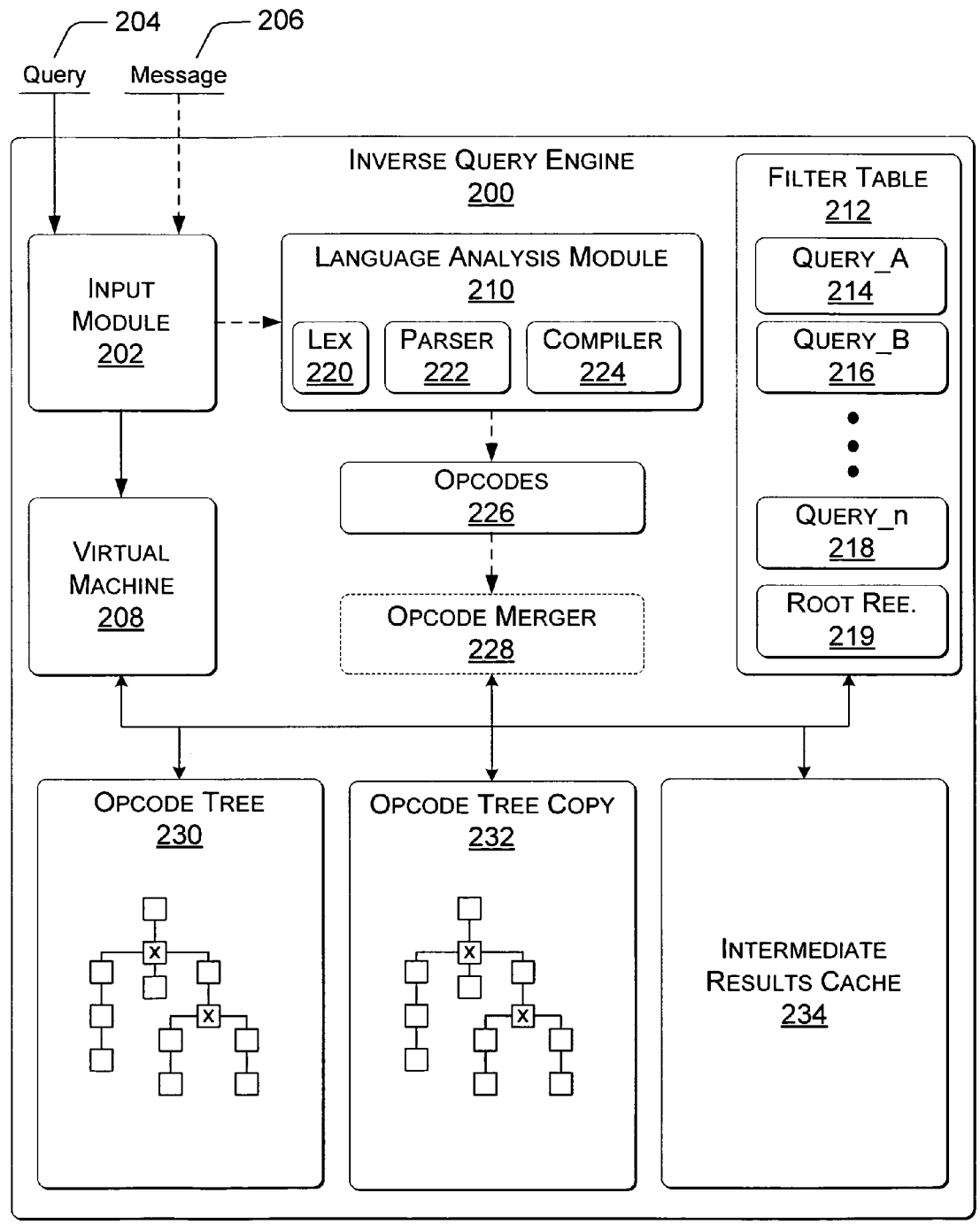
FIG. 2 is a block diagram of an exemplary inverse query engine.

FIG. 2 is a block diagram of an inverse query engine 200 in accordance with the present description. The inverse query engine 200 is similar to the filter engine 116 shown in FIG. 1. In the following discussion, reference may be made to particular elements and reference numerals shown in FIG. 1.

The inverse query engine 200 includes an input module 202 that is configured to receive queries 204 and messages 206. Although the input module 202 is depicted as a single logical unit, in practice separate input modules may be utilized. In such a configuration, a first input module would be configured to receive input queries and a second input module would be configured to receive input messages.

In the present example, the queries are XPath queries and the messages are constructed according to a protocol compatible therewith, such as the Simple Object Access Protocol (SOAP). It is noted, however, that the queries and the messages may be formatted according to one or more other languages and/or protocols.

The inverse query engine 200 also includes a query processor 208 that is configured to execute instructions within the inverse query engine 200 to provide the functionality thereto, such as processing input messages against queries, etc. A language analysis module 210 is configured to recognize and handle queries input into the inverse query engine 200. The inverse query engine 200 also includes at least one filter table 212 that stores multiple queries (query_A 214, query_B 216 through query_n 218). The filter table 212 includes a reference 219 to an opcode tree 230.

The language analysis module 210 includes components that recognize and compile queries that are added to the inverse query engine 200. In the present example, the language analysis module 210 includes a lexical analysis module ("lexer") 220, a parser 222 and a compiler 224. The lexer 220 receives an input and groups characters included in the input into elemental language units (tokens) which are then sent to the parser 222. The parser 222 analyzes the tokens received from the lexer 220 and breaks them into constituent parts. The compiler 224 translates the information from the lexer 220 and the parser 222 into opcodes that the query processor 208 uses to process the input queries.

The compiler 224 generates opcodes 226, from each query that it compiles Each query produces a set of opcode objects called an opcode block. An opcode merger 228 merges opcode blocks containing newly compiled opcode objects into the opcode tree 230.

The opcode tree 230 includes opcode nodes objects and branch nodes as described above. Each opcode node comprises an opcode object. The opcode tree 230 is a logical structure that includes opcode nodes, some of which include references to other opcode nodes to create a linked list. Creation and maintenance of the opcode tree 230 will be discussed in greater detail below.

The inverse query engine 200 also maintains an opcode tree copy 232 that is used during processing so that operations may be undertaken on the opcode tree 230 without interfering with query processing. Updates are made to the opcode tree copy 232 while the opcode tree 230 remains available for query processing. When the updates are complete, the updated opcode tree copy 232 is stored as the opcode tree 230. Thus, a current version of the opcode tree 230 is always available for query processing.

An intermediate results cache 234 is include in the inverse query engine 200 to store intermediate results obtained during execution of the opcode tree, and execution contexts related to opcode tree processing. The contents of the intermediate results cache 234 are used as described above to avoid re-execution of opcode nodes that are common to more than one query.

The elements shown in the inverse query engine 200 will be discussed in greater detail below, with respect to the following figures.

Exemplary Opcode Tree

Figure 3:
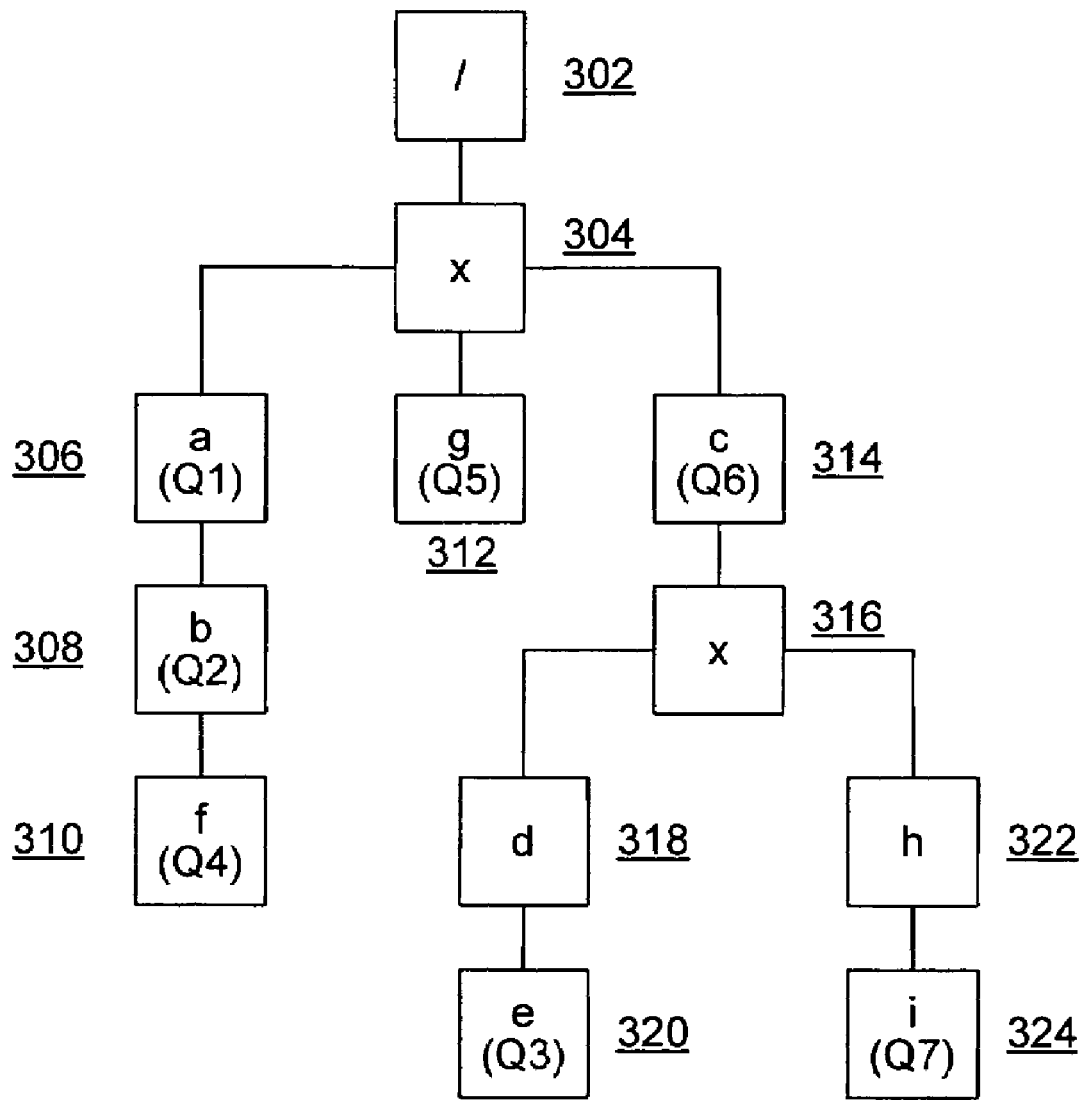
FIG. 3 is a depiction of an exemplary opcode tree.

FIG. 3 is a depiction of an exemplary opcode tree 300 having opcode nodes and branch nodes. For discussion purposes, an exemplary filter table that includes the queries listed below in Table 1 is presented. It is noted that the queries shown in Table 1 do not conform to exact XPath query syntax. Rather, the queries have been simplified to better demonstrate the structure and function of the opcode tree 300. For example, the XPath query expression /env:Envelope/env:Headers/wsa:Action="http://abc.com"

is simply represented below (as Query 1) as "action=http://abc.com". The highlighted reference letters shown in brackets ("[ ]") adjacent to certain query expressions identify the corresponding segments in the opcode tree 300.

TABLE 1

Exemplary Filter Table Queries

Q1: action = http://abc.com [a]
Q2: action = http://abc.com [a] AND weight = 32 [b]
Q3: action = http://xyz.com [c] AND (weight = 40 [d] OR priority = 1 [e])
Q4: action = http://abc.com [a] AND weight = 32 [b] AND priority > 1 [f]
Q5: priority = 1 [g]
Q6: action = http://xyz.com [c]
Q7: (action = http://xyz.com [c] AND weight < 40 [h]) OR priority > 1 [i]

Using the segment identifiers [a]-[i], the queries can be expressed briefly as follows:

Q1=a
Q2=a, b
Q3=c, d, e
Q4=a, b, f
Q5=g
Q6=c
Q7=c, h, i

In the above example, the query compiler (a simplistic one) has compiled Q2 into an opcode block containing 2 opcodes: a, b. Opcode 'a' will evaluate the expression "action=http://abc.com". The opcodes are also labeled 'a' and 'b' for illustration—to show correspondence to expressions. It is apparent that opcode blocks for some queries contain opcodes that are contained in other queries. For example, Q1, Q2 and Q4 all begin with opcode [a]. It is this type of similarity between queries that is exploited in the use of the opcode tree.

The opcode tree 300 is structured in accordance with the group of queries shown in Table 1. The opcode tree 300 has a root node 302 and a first branch node 304. The first branch node 304 is the root node of multiple sub-trees, or branches which are executed recursively. Each branch is traversed sequentially and opcode nodes are executed as they are encountered. The traversal and execution are described in greater detail below, with respect to FIG. 5.

Opcode node 306 of the opcode tree 300 is associated with expression [a] of Query 1 (Table 1). Since Query 1 consists of a simple expression (i.e., it is not a compound expression made up of multiple sub-expressions), the expression contained in Query 1—"action="http://abc.com"—is compiled and the resulting opcode object is associated with opcode node 306. Traversing the opcode tree 300 with regard to an input from the root node 302 through the first branch node 304 to opcode node 306 executes Query 1 (Q1).

Since Query 2 and Query 4 also begin with expression [a], opcode node 306 can also be used in the evaluation of these queries. Thus, two additional evaluations of expression [a] are avoided by using the result associated with opcode node 306.

The second opcode segment of Query 2—expression [b]—follows immediately after expression [a]. Therefore, opcode node 308 is created as a child node of opcode node 306 to represent expression [b]. Query 2 is represented by the opcode tree path of root node 302, first branch node 304, opcode node 306 and opcode node 308.

Query 4 includes expression [a] and expression [b] but also includes expression [f]. Therefore, opcode node 310, which corresponds to expression In, is created as child node of node 308. Query 4 is represented by an opcode tree path of root node 302, first branch node 304, opcode node 306, opcode node 308 and opcode node 310.

There are no other queries that begin with expression [a], so a new branch is created from the first branch node 304 to correspond with a different expression that begins a query. In the present example, Query 5 begins with expression [g], so opcode node 312 is created off of the first branch node 304. Since no query contains any expressions subsequent to expression [g], opcode node 312 does not have any child nodes.

There are other queries that begin with an expression other than the expressions that have already been mapped (expressions [a], [b], [f] and [g]), so a new branch is created off of the first branch node 304 for these other expressions. Opcode node 314 is created off of the first branch node 304 to represent expression [c], which begins Query 3, Query 6 and Query 7.

It is noted that the queries and the opcode tree 300 are both of a hierarchical nature. The opcode tree 300 has different levels that correspond to opcode segments in different positions. The first level in the opcode tree 300 under the root node corresponds with an initial opcode segment of the queries. In the present example, there are three distinct initial opcode segments in the queries that correspond to three distinct nodes in the first level of the tree.

Since there are no distinct opcode segments that start a query other than those represented by opcode node 306, opcode node 312 and opcode node 314, there are no additional child nodes subordinate to the first branch node 304.

Query 3 and Query 7 begin with the same query segment ([c]) that is represented by opcode node 314 but include subsequent segments. Therefore, Query 3 and Query 7 will require a separate branch off of opcode node 314. A second branch node 316 initiates the branches for Query 3 and Query 7. Query 3 includes the subsequent expressions [d] and [e], so these expressions make up the branch associated with Query 3. Opcode node 318 corresponds to expression [d] and opcode node 320 corresponds to expression [e].

A branch corresponding to Query 7 is created off of the second branch node 316. Query 7 includes two expressions after expression [c], namely expression [h] and expression [i]. Therefore, the branch includes opcode node 322 that corresponds to expression [h] and opcode node 324 that corresponds to expression [i].

Exemplary Methodological Implementation: Parallel Query Evaluation

Figure 4:
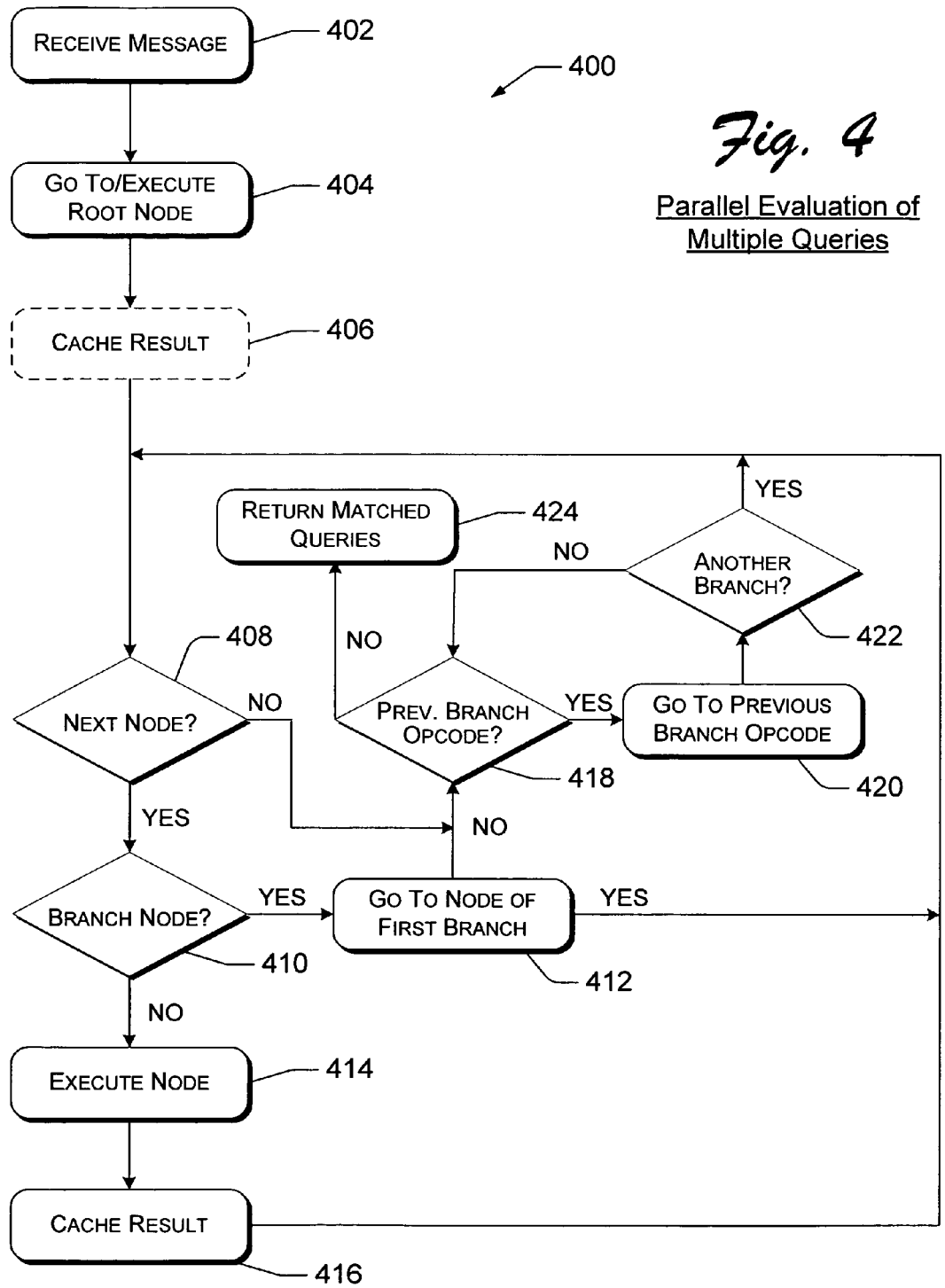
FIG. 4 is a flow diagram depicting a methodological implementation of parallel evaluation of multiple queries.

FIG. 4 is a flow diagram 400 depicting a methodological implementation of parallel evaluation of multiple queries using the opcode tree techniques described herein. In the following discussion of FIG. 4, continuing reference will be made to the elements and reference numerals included in FIGS. 2 and 3.

At block 402, the message 206 is received via the input module 202 of the inverse query engine 200. The message 206 is input to the query processor 208 for evaluation against the filter table 212. To perform the evaluation, the nodes of the opcode tree 300 are traversed and each opcode node is executed. Initially, control is directed to the root node 302 (block 404) of the opcode tree 300. In the present example, the root node 302 is not associated with any executable query opcode segment but in some instances, the root node 302 may contain opcodes that will be executed at block 404. If an opcode object is executed for the root node, the intermediate result is cached at block 406. In most instances, block 406 will not be necessary.

If there is a next node to evaluate ("Yes" branch, block 408) it is determined if the next node is a branch node at block 410. At this point in the present example, the next node is the first branch node 304. If the next node is a branch node ("Yes" branch, block 410), the process proceeds with a following node of a first branch off the first branch node at block 408. If the node is not a branch node ("No" branch, block 410), then the opcode node is executed at block 414 and the intermediate result is cached at block 416 (although this step may not be necessary in most instances).

The process then reverts to block 408 and subsequent nodes are processed until a leaf node at the end of a branch is reached. At that point, there are no more nodes to be processed in the currently executed branch ("No" branch, block 408). If there is a previous branch node ("Yes" branch, block 418), then focus is returned to the previous branch node at block 420. If there is another branch from that branch node ("Yes" branch, block 422), then the process reverts to block 408 for additional processing of nodes in the next branch off the branch node.

If there is not another branch from the branch node ("No" branch, block 422), then it is determined if there is a previous branch node at block 418. If so, the process repeats as described above. If there is not a previous branch node ("No" branch, block 418), then control is at the highest branch node in the opcode tree 300 and there are no more branches from that branch node that need to be evaluated. Therefore, the opcode tree 300 has been executed in its entirety and the message 206 has been evaluated against each query in the filter table 212.

Queries that were satisfied by the input message 206 are returned at block 424. In the previous example of the message evaluated against the queries included in Table 1, the matching queries are Query 1 and Query 7. The inverse query engine 200 then performs post-processing on the matching queries, such as taking an action associated with one or more of the matching queries.

Exemplary Methodological Implementation: Merging Opcodes

Figure 5:
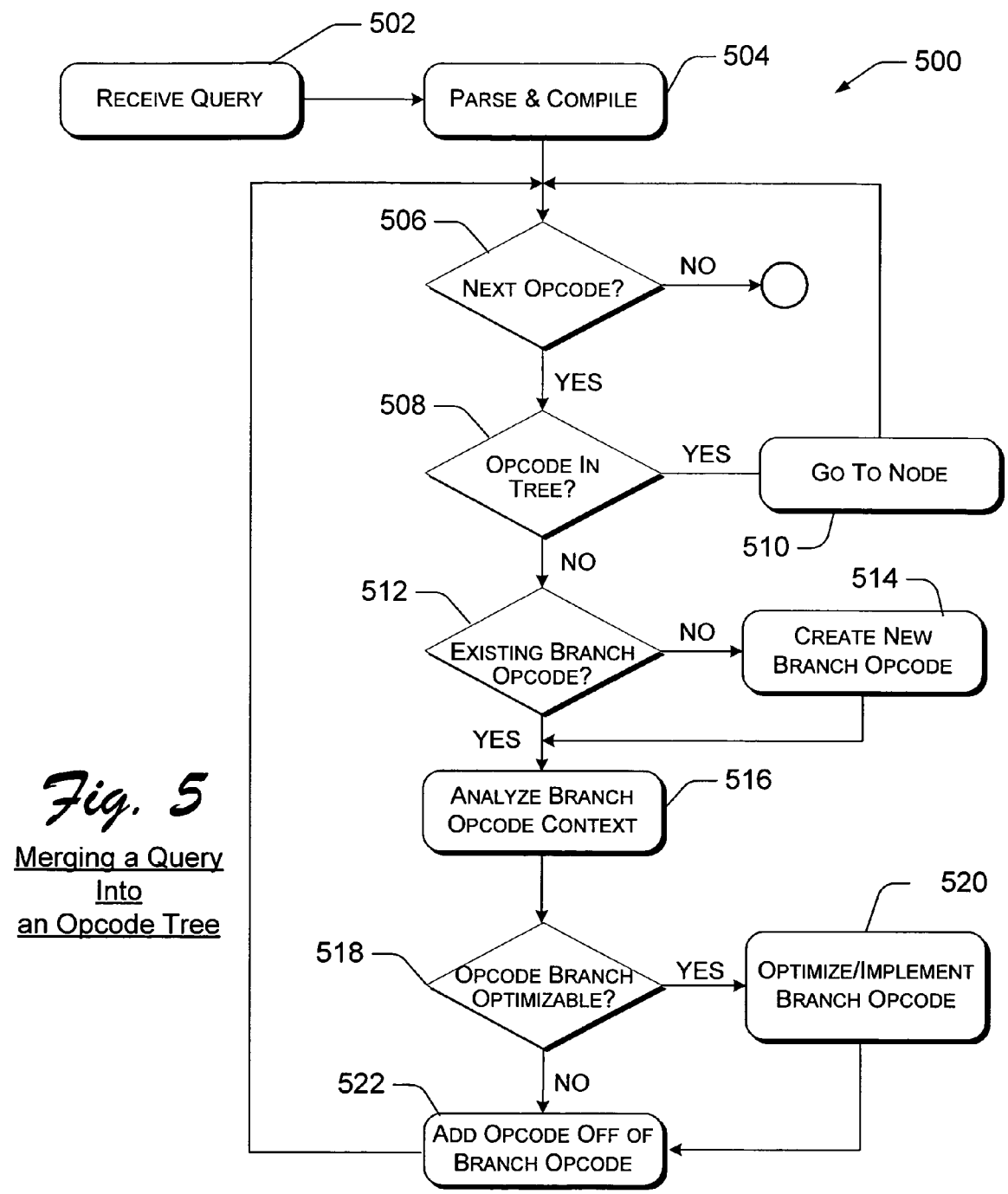
FIG. 5 is a flow diagram depicting a methodological implementation of adding a query to an inverse query engine that utilizes an opcode tree.

FIG. 5 is a flow chart 500 depicting a methodological implementation for merging a query into an opcode tree. In the following discussion, continuing reference will be made to the elements and reference numerals of FIGS. 2 and 3.

At block 502, the input module 202 receives a query 204 to add to the filter table 224. The query 204 is directed to the language analysis module 210 where it is parsed and compiled into opcode objects 226 (block 504). The opcode objects 226 are then ready to be merged into the opcode tree 230.

In the following discussion, the opcode merger 232 handles the process of merging the opcode objects 226 into the opcode tree 230. However, in another implementation, opcode objects are configured to merge themselves into the opcode tree 230. In such a case, the logic required to understand the relationship between an opcode object and the opcode tree is embedded in an instance of an object that is created when a query is compiled. The latter implementation allows new optimization techniques to be added without having to implement logic into the opcode merger. Only an object would have to be updated. This implementation is described in greater detail below.

The opcode merger 232 takes an available opcode object ("Yes" branch block 506) and determines if an identical opcode object is already in the opcode tree 230, beginning the analysis at the root node 302. If the opcode object is already in the opcode tree ("Yes" branch, block 508), then the process focuses on that node in the tree and a next opcode object—if available—is processed beginning at block 506.

If the opcode object is not in the opcode tree ("No" branch, block 508), then it must be determined if a branch node exists immediately below the last node that corresponded to a query opcode object already in the opcode tree 300. For example, referring to the opcode tree 300 in FIG. 3, suppose that a new query being merged into the tree was structured as "Action=xyz.com/123". Since "xyz.com" is already represented by opcode node 314 (expression [c]), a new branch would have to be created for the "/123" portion of the query. Opcode node 314 already has two branches so there is an existing branch node 316 ("Yes" branch, block 512). Therefore, a new opcode node will be added as a branch off of the existing branch node 316. If there was not an existing branch node ("No" branch, block 512), a new branch node would be created at block 514.

Before a new opcode node is added to the opcode tree 300, the opcode merger 228 evaluates the context of the branch node to determine if an optimization can be made to the branch node (block 516). If the branch node can be optimized ("Yes" branch, block 518), the branch node is optimized and implemented at block 520. The new opcode node is then added as a new branch off of the branch node (block 522).

If the branch node cannot be optimized ("No" branch, block 518), the new opcode node is simply added as a new node off of the branch node at block 522. Optimization techniques are described in greater detail below.

The process is repeated from block 506 until there are no more opcode nodes to merge into the opcode tree 230. If the previously described operations have been performed on an opcode tree copy 232 to preserve the opcode tree 230 for processing during the merge operation, the opcode tree copy 232 is stored as the opcode tree 230 at this time.

Optimizations

There are situations where an optimization technique can be implemented to increase the efficiency of the query evaluation process. In some systems, a majority of expressions included in queries perform similar operations. For example, queries written in XPath frequently perform literal comparisons. Table 2 includes some exemplary XPath expressions that could be included in one or more queries.

TABLE 2

Exemplary XPath Queries (1) /Envelope/Headers/Action = 'http://abc.com/xyz'
(2) /Envelope/Headers/Action = 'http://abc.com/xyz' and /Envelope/Headers/Weight = 32
(3) /Envelope/Headers/Hopcount/TTL = 54
(4) /XYZ/Priority > 3 and /XYZ/Priority <=5

All of the queries shown in Table 2 test literals against source values and return a Boolean result (T or F). Such queries are compiled into expressions using opcodes that are designed to perform literal comparisons.

For example, suppose the following XPath expressions are to be tested against a given input:

LHS='xyz1'
LHS='xyz2'
LHS='xyz3'
LHS='xyz4'
LHS='xyz5'
LHS='xyz6'
LHS='xyz7'
LHS='xyz8'
LHS='xyz9'
LHS='xyz10'

The opcode merger is configured to combine opcode blocks derived from compiling the expressions into an opcode tree logically arranged as follows, where [x] represents a branch node:

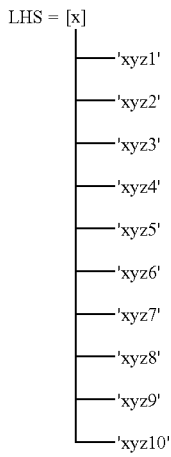

The prefix common to each expression ("LHS=") is blended into the opcode tree as an opcode node, and each diverging literal forms a different branch from the opcode node. When an input message is processed against an opcode tree containing this structure, the value associated with "LHS" is retrieved once. However, to compute the Boolean result of each branch, the query processor 208 performs a literal comparison for each branch. As a general rule, if there were n such expressions, the query processor would have to perform n string comparisons to find the result for each literal comparison.

In the exemplary case, it would be much more efficient to utilize a hash function to optimize the comparisons. When merging opcode objects into an opcode tree, the opcode merger 228 is configured to detect a situation in which an optimization algorithm can be implemented and combines literal comparisons into an indexed literal branch opcode object. The specialized branch opcode takes the place of a generic branch node in the opcode tree.

An indexed literal branch opcode includes a branch index that contains (key, value) pairs. The literals form the key, and an identifier associated with a branch of a literal is associated with its value. When a query containing the literal is evaluated, the value of the literal is hashed to derive an index entry that references the literal value. In some cases, multiple entries will be identified.

Branch index objects allow the result of every branch to be obtained very quickly, frequently by making a single comparison. In the above example, the value of "LHS" is retrieved, hashed and looked up in the index. The index returns a set of (key, value) pairs, where the key is the value of matching literals and the value identifies branches to which the literal belongs. Every branch that is identified evaluates to True. The other branches, therefore, evaluate to False.

Indexed branch opcode objects provide a general framework for insertion of indexing techniques that are customized to the type of comparison involved. Types of comparisons that may be implemented with indexed branch opcode literals include, but are not limited to, string and number equality literals using hash tables, interval trees to optimize numeric interval queries, opcodes that perform string prefix matching using tries (a standard computer science data structure designed for optimal string prefix matching), and the like.

Optimizing opcode objects may sometimes require devolving from a specialized optimization technique to a linear comparison. In the example of a hash table, it may only be more efficient to utilize a hash table when there are, say, more than fifty entries in the hash table. If such a case, removing a few opcode nodes may make the hashing operation more expensive than a literal comparison procedure.

The opcode merger 228 is configured to recognize such situations and remove an optimization technique if the removal will increase efficiency. In an implementation where an opcode merger 228 is not used, opcode objects will include logic to recognize these particular situations and to reform an indexed branch literal opcode object, for example, into a generic branch opcode object.

Removing opcode nodes from the opcode tree are described in more detail below.

Removing Opcode Nodes

Sometimes it is necessary to remove opcode nodes from an opcode tree 230. In such a situation, the inverse query engine 200 is requested to remove a particular query. To remove opcode nodes associated with the query, a component of the inverse query engine 200 (such as the opcode merger 228 or the query processor 208) traverses the opcode tree 230 and attempts to identify tree segments that are common between the query being removed and at least one other query in the opcode tree.

The opcode tree is traversed according to the query to be removed until a branch node is encountered that begins a branch specific to the query to be removed. Only the branch that is specific to the query is removed. In cases where removal of the specific branch causes removal of one of two branches, a branch node that was the point of divergence for the two branches is removed, since a branch node at that location is no longer required.

Exemplary Computer Environment

Figure 6:
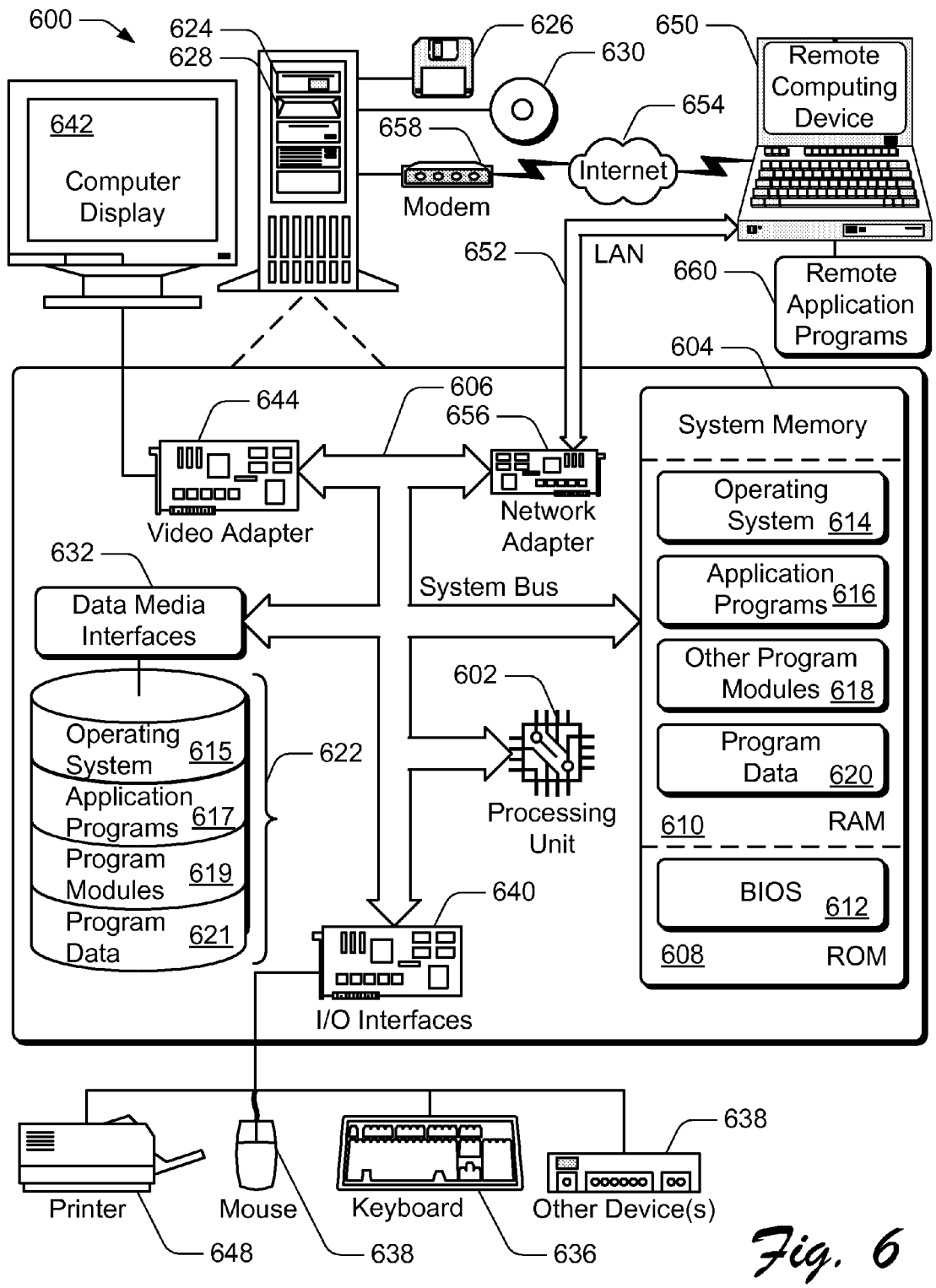
FIG. 6 is a diagram of an exemplary computing environment in which the implementations described herein may operate.

The various components and functionality described herein are implemented with a computing system. FIG. 6 shows components of typical example of such a computing system, i.e. a computer, referred by to reference numeral 600. The components shown in FIG. 6 are only examples, and are not intended to suggest any limitation as to the scope of the functionality of the invention. Furthermore, the invention is not necessarily dependent on the features shown in FIG. 6.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 6, the components of computer 600 may include, but are not limited to, a processing unit 602, a system memory 604, and a system bus 606 that couples various system components including the system memory to the processing unit 602. The system bus 606 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 600 typically includes a variety of computer-readable media. Computer-readable media can be any available media that can be accessed by computer 600 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 600. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 604 includes computer storage media in the form of volatile and/or nonvolatile memory such as read only memory (ROM) 608 and random access memory (RAM) 610. A basic input/output system 612 (BIOS), containing the basic routines that help to transfer information between elements within computer 600, such as during start-up, is typically stored in ROM 608. RAM 610 typically contains data and/or program modules that are immediately accessible to and/or presently being operated on by processing unit 602. By way of example, and not limitation, FIG. 6 illustrates operating system 614, application programs 616, other program modules 618, and program data 620.

The computer 600 may also include other removable/non-removable, volatile/nonvolatile computer storage media. By way of example only, FIG. 6 illustrates a hard disk drive 622 that reads from or writes to non-removable, nonvolatile magnetic media, a magnetic disk drive 624 that reads from or writes to a removable, nonvolatile magnetic disk 626, and an optical disk drive 628 that reads from or writes to a removable, nonvolatile optical disk 630 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 622 is typically connected to the system bus 606 through a non-removable memory interface such as data media interface 632, and magnetic disk drive 624 and optical disk drive 628 are typically connected to the system bus 606 by a removable memory interface.

The drives and their associated computer storage media discussed above and illustrated in FIG. 6 provide storage of computer-readable instructions, data structures, program modules, and other data for computer 600. In FIG. 6, for example, hard disk drive 622 is illustrated as storing operating system 615, application programs 617, other program modules 619, and program data 621. Note that these components can either be the same as or different from operating system 614, application programs 616, other program modules 618, and program data 620. Operating system 615, application programs 617, other program modules 619, and program data 621 are given different numbers here to illustrate that, at a minimum, they are different copies. A user may enter commands and information into the computer 600 through input devices such as a keyboard 636 and pointing device 638, commonly referred to as a mouse, trackball, or touch pad. Other input devices (not shown) may include a microphone, joystick, game pad, satellite dish, scanner, or the like. These and other input devices are often connected to the processing unit 602 through an input/output (I/O) interface 640 that is coupled to the system bus, but may be connected by other interface and bus structures, such as a parallel port, game port, or a universal serial bus (USB). A monitor 642 or other type of display device is also connected to the system bus 606 via an interface, such as a video adapter 644. In addition to the monitor 642, computers may also include other peripheral output devices and one or more printers 648, which may be connected through the I/O interface 640.

The computer may operate in a networked environment using logical connections to one or more remote computers, such as a remote computing device 650. The remote computing device 650 may be a personal computer, a server, a router, a network PC, a peer device or other common network node, and typically includes many or all of the elements described above relative to computer 600. The logical connections depicted in FIG. 6 include a local area network (LAN) 652 and a wide area network (WAN) 654. Although the WAN 654 shown in FIG. 6 is the Internet, the WAN 654 may also include other networks. Such networking environments are commonplace in offices, enterprise-wide computer networks, intranets, and the like.

When used in a LAN networking environment, the computer 600 is connected to the LAN 652 through a network interface or adapter 656. When used in a WAN networking environment, the computer 600 typically includes a modem 658 or other means for establishing communications over the Internet 654. The modem 658, which may be internal or external, may be connected to the system bus 606 via the I/O interface 640, or other appropriate mechanism. In a networked environment, program modules depicted relative to the computer 600, or portions thereof, may be stored in the remote computing device 650. By way of example, and not limitation, FIG. 6 illustrates remote application programs 660 as residing on remote computing device 650. It will be appreciated that the network connections shown are exemplary and other means of establishing a communications link between the computers may be used.

CONCLUSION

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. A method for updating a filter engine opcode tree, the method implemented by a computer comprising a processor and a memory, the method comprising the following steps:
   (a) compiling a new query to derive a series of opcode objects;
   (b) traversing the opcode tree according to the series of opcode objects until an opcode object is encountered that is not included in the opcode tree, opcode objects being represented in the opcode tree as opcode nodes; and
   (c) adding new opcode tree opcode nodes to correspond to the encountered opcode object and subsequent opcode objects in the series of opcode objects;
   (d) updating a branch node in the opcode tree to add a reference to the new opcode nodes, the branch node being referenced from a parent opcode node that corresponds to a last opcode object from the series of opcode objects that was found in the traversal of the opcode tree;
   (e) implementing an optimized branch node that includes an optimized indexed lookup procedure, wherein the optimized lookup procedure comprises an interval tree function to optimize numeric interval queries; and
   (f) restoring the optimized branch node to a generic branch node when the optimized branch node is no longer more efficient than the generic branch code.

2. The method as recited in claim 1, wherein one or more of the steps are performed dynamically at runtime.

3. The method as recited in claim 1, further comprising performing steps (b) and (c) in a component of the filter engine.

4. The method as recited in claim 1, further comprising executing the opcode tree against an input to evaluate the new query and one or more other queries against the input.

5. The method as recited in claim 1, further comprising:
   receiving a request to remove a first query from the opcode tree;
   identifying one or more opcode nodes in the opcode tree that correspond to the first query;
   removing any identified opcode node that does not correspond to a second query.

6. The method as recited in claim 1, the branch node further comprising updating the branch node to include an indexed lookup routine that references several dependent opcode nodes that perform a similar function.

7. The method as recited in claim 6, further comprising analyzing opcode nodes that depend from the branch node and including the indexed lookup routine only if including the indexed lookup routine provides more efficient processing of the dependent nodes that a generic branch node processing routine.

8. A filter engine stored on one or more computer storage media, comprising:
   a filter table that includes a plurality of queries, at least two of the queries including a common prefix;
   a compiler configured to compile each query into a series of opcode blocks;
   an opcode tree stored in memory and including opcode nodes that each correspond to an opcode block such that executing the opcode nodes evaluates the plurality of queries, at least one opcode node corresponding to an opcode block included in the common prefix;
   an opcode merger configured to merge a new query to the opcode tree by adding at least one opcode node that corresponds to the new query to the opcode tree,
   wherein, when an opcode node will depend from a branch node when added to the opcode tree, identifying one or more child opcode nodes that depend from the branch opcode; and
   implementing an optimized branch node that includes an optimized indexed lookup procedure if such implementation would increase branch processing efficiency and referencing the opcode node from the optimized branch node, wherein:
   the optimized indexed lookup procedure further comprises an interval tree function to optimize numeric interval queries;
   the opcode merger is further configured to restore an optimized branch node to a generic branch node when the optimized branch node is no longer more efficient that the generic branch node.

9. The filter engine as recited in claim 8, the opcode merger further configured to traverse the opcode tree to determine if an opcode node corresponding to the new query already exists in the opcode tree and add new opcode nodes that correspond to query opcode blocks that are not already included in the opcode tree.

10. The filter engine as recited in claim 8, wherein opcode nodes corresponding to opcode blocks included in a common prefix are represented as a shared segment in the opcode tree.

11. The filter engine as recited in claim 8, wherein queries are merged into the opcode tree dynamically at runtime.

12. The filter engine as recited in claim 8, further comprising XPath queries in the plurality of queries.

13. The filter engine as recited in claim 8, the compiler being further configured to create opcode objects that are configured to merge themselves into an appropriate location in the opcode tree.

14. A compiler stored on one or more computer storage media, containing computer-executable instructions for performing the following steps:
   receiving a query to be added to an opcode tree that represents a plurality of queries, at least two of which include similar prefixes; compiling a query to produce one or more opcode objects that are each configured to merge into the opcode tree as an opcode node by determining an appropriate location in the tree to merge, and merging into the tree in accordance with a node context of the appropriate location;

determining a function that the opcode object performs;

determining if a branch node that will reference the opcode node corresponding to the opcode object also references other opcode nodes that perform a similar function; and implementing an optimized branching function in the branch node including an optimized lookup procedure if the branch node can be optimized to more efficiently process the opcode nodes that it references, wherein the optimized lookup procedure comprises an interval tree function to optimize numeric interval queries; and restoring the optimized branch node to a generic branch node when the optimized branch node is no longer more efficient than the generic branch code.

15. The compiler as recited in claim 14, further comprising producing opcode objects that are further configured to merge into the opcode tree only if an identical opcode object corresponding to a similar query prefix is not already included in the opcode tree.

16. The compiler as recited in claim 14, wherein a query further comprises an XPath query.

17. The compiler as recited in claim 14, wherein:

the compiler is configured to receive the query and generate the opcode at runtime; and the opcode node is configured to merge itself into the opcode tree at runtime.

18. An opcode object stored on one or more computer storage media, including computer-executable instructions that, when executed on a computer, perform the following steps:

determining an appropriate location to merge itself as a new opcode node in an opcode tree when a query from which the opcode object is derived is added to a filter table represented by the opcode tree including opcode nodes that, when executed, evaluate the queries;

evaluating a node context of the location to which the new opcode node will be added; and merging itself into the opcode tree by adding and/or modifying references from an opcode node or a branch node to the new opcode node, wherein evaluating a node context further comprises:

identifying a generic branch opcode from which the new node will depend;

identifying one or more other nodes that depend from the generic branch opcode that include a similar expression as the new node; and if a sufficient number of the one or more other nodes exists, modifying the generic branch opcode to an optimized branch opcode that includes an indexed lookup procedure that is optimized to more efficiently process the similar expressions, wherein the optimized lookup procedure comprises an interval tree function to optimize numeric interval queries; and restoring the optimized branch node to a generic branch node when the optimized branch node is no longer more efficient than the generic branch code.

19. The opcode block as recited in claim 18, further configured to perform the recited steps dynamically at runtime.

20. The opcode block as recited in claim 18, further configured to perform the recited steps within a .NET environment.

21. The opcode block as recited in claim 18, wherein evaluating a node context further comprises:

identifying an optimized branch opcode from which the new node will depend;

identifying one or more other nodes that depend from the optimized branch opcode that include a similar expression as the new node; and if minimum threshold number of the one or more other nodes is not met, modifying the optimized branch opcode to a generic branch opcode that can process the number of one or more other nodes more efficiently than the optimized branch opcode can.

22. A method for removing a first query from an opcode tree, the method implemented by a computer comprising a processor and a memory, the method comprising:

identifying an opcode tree that includes opcode nodes representing multiple queries such that when the opcode tree is executed, each of the multiple queries is evaluated;

identifying one or more opcode nodes that correspond to the first query;

removing any opcode node that does not correspond to a second query; and modifying a branch node that references an opcode node that is removed from the opcode tree, wherein the modifying further comprises removing an optimized lookup function that includes an indexed lookup routine from the branch node if removing the branch node renders the lookup function less efficient than a direct comparison function, wherein the optimized lookup procedure comprises an interval tree function to optimize numeric interval queries.

23. The method as recited in claim 22, wherein the modifying further comprises removing the branch node if the branch node references only one other opcode node other than the opcode node to be removed.

24. The method as recited in claim 22, wherein the modifying further comprises implementing an optimized processing function in the branch node if the removal of the branch node creates a context in which the optimized processing function would increase efficiency of the branch node processing.

25. The method as recited in claim 24, wherein the optimized processing function further comprises one of the following functions: a hash function; an interval tree function; a function using tries.

26. One or more computer storage media, containing computer-executable instructions that, when executed on a computer, perform the following steps:

identifying an opcode block that corresponds to a query to be added to an opcode tree that represents multiple queries with a plurality of opcode nodes;

identifying an appropriate location in an opcode tree to situate new opcode nodes that correspond to a sequence of opcode objects in the opcode block, the opcode tree including at least one shared opcode node that corresponds to at least two of the multiple queries;

evaluating a location context; and modifying an opcode node or a branch node to incorporate a new opcode node, wherein, the evaluation step further comprises evaluating a plurality of dependent opcode nodes that depend from a branch node from which the new opcode node depend; and the modifying step further comprises modifying the branch node to include an indexed lookup function if the dependent opcode nodes perform a similar function and processing the dependent opcode with the indexed lookup function increases the efficiency thereof, wherein the optimized lookup procedure comprises an interval tree function to optimize numeric interval queries.

27. The one or more computer storage media as recited in claim 26, wherein the queries are XPath queries.

28. The one or more computer storage media as recited in claim 26, wherein the steps are performed by an inverse query engine.

29. The one or more computer storage media as recited in claim 26, wherein the identifying step, the evaluating step and the modifying step are performed by the new opcode node.

30. The one or more computer storage media as recited in claim 26, wherein the steps are performed in a Common Language Runtime (CLR) environment.

\* \* \* \* \*